United States Patent [19]
Kawamura et al.

[11] Patent Number: 5,467,444
[45] Date of Patent: Nov. 14, 1995

[54] METHOD OF THREE-DIMENSIONAL DISPLAY OF OBJECT-ORIENTED FIGURE INFORMATION AND SYSTEM THEREOF

[75] Inventors: Fumio Kawamura, Fujisawa; Shigeru Shimada, Kodaira; Tsutomu Ikeda, Abiko, all of Japan

[73] Assignees: Hitachi, Ltd., Tokyo; Ltd. Hitachi Engineering & Services Co, Ibaraki, both of Japan

[21] Appl. No.: 789,005

[22] Filed: Nov. 7, 1991

[30] Foreign Application Priority Data

Nov. 7, 1990 [JP] Japan .................................. 2-299718

[51] Int. Cl.[6] .................................................. G06F 15/50
[52] U.S. Cl. .................................................. 395/141
[58] Field of Search .................................. 395/133, 140, 395/135, 155, 161, 141; 345/113, 114, 117

[56] References Cited

U.S. PATENT DOCUMENTS

| | | | |
|---|---|---|---|
| 4,377,916 | 4/1988 | Ogawa et al. | 364/443 |
| 4,737,927 | 4/1988 | Hanabusa et al. | 364/443 |
| 4,847,788 | 7/1989 | Shimada | 364/522 |
| 4,928,253 | 5/1990 | Yamauchi et al. | 364/521 |

Primary Examiner—Phu K. Nguyen
Attorney, Agent, or Firm—Antonelli, Terry, Stout & Kraus

[57] ABSTRACT

In a system for displaying map information, an object base storage unit stores an object base relating to relational objects, a map data base storage unit stores a map data base relating to figure elements of map data, and an attribute data base storage unit stores an attribute data base relating to attribute data related to the figure elements of the map data. In response to an input command, a head one of the relational objects is retrieved from the object base, and entity objects are desired from a head relational object by referring to the object base, so that each of the desired entity objects is processed. The map data retrieving section retrieves the map data from the map data base in response to the processing of each map data entity object of the derived entity objects, and the attribute data retrieving section retrieves the attribute data from the attribute data base in response to the execution of each of attribute data entity objects of the derived entity objects. The converting section converts the map data and attribute data into three-dimensional display data and the display data is three-dimensionally displayed on the display unit. In this case, predetermined height data for the attribute of each figure element of the map data is stored in a table in advance. The height data is obtained by referring to the table in accordance with the attribute data, and the map data is converted into three-dimensional map data based on the obtained height data.

30 Claims, 12 Drawing Sheets

FIG. 2A
FIGURE PORTION

| | |
|---|---|
| FIGURE TABLE HEADER (LRT001) | |
| CONSTITUENT ITEMS OF 1st RECORD (ADL001) | $N_1$ |
| TYPE OF LINE | $KL_1$ |
| STARTING POINT INFORMATION | $SI_1$ |
| ENDING POINT INFORMATION | $EI_1$ |
| STARTING POINT X COORDINATER | $X_1$ |
| Y COORDINATER | $Y_1$ |
| ⋮ | |
| BENDING POINT X COORDINATER | $X_M$ |
| Y COORDINATER | $Y_M$ |
| ⋮ | |
| ENDING POINT X COORDINATER | $XN_1$ |
| Y COORDINATER | $YN_1$ |
| CONSTITUENT ITEMS OF 2nd RECORD (ADL002) | $N_2$ |
| TYPE OF LINE | $KL_2$ |
| | $SI_2$ |
| | $EI_2$ |

FIG. 2B
TEXT PORTION

| | |
|---|---|
| TEXT TABLE HEADER (TRT001) | |
| NUMBER OF TEXTS OF 1st RECORD (ADT001) | $M_1$ |
| TYPE OF LINE | $KT_1$ |
| WIDTH OF LETTER | $W_1$ |
| HEIGHT OF LETTER | $H_1$ |
| SLOPE ANGLE | $V_1$ |
| ROTATION ANGLE | $R_1$ |
| DEVELOPMENT DIRECTION FLAG | $F_1$ |
| REFERENCE POINT X COORDINATER | $X_1$ |
| Y COORDINATER | $Y_1$ |
| TEXT CODE 1 | $TC1$ |
| TEXT CODE 2 | $TC2$ |
| ⋮ | |
| TEXT CODE $M_1$ | $TCM_1$ |
| NUMBER OF TEXTS OF 2nd RECORD (ADT002) | $M_2$ |
| TYPE OF LINE | $KT_2$ |
| WIDTH OF LETTER | |

F I G. 3

| RESIDENT ID | RESIDENT NUMBER | NUMBER OF FLOORS | NAME OF OWNER | TELEPHONE NUMBER | HOUSE LAYOUT |
|---|---|---|---|---|---|
| 632465 | AB102 | 1 | M. TANAKA | 263-1145 | 3DK |
| 721177 | AB104 | 1 | S. KIKUCHI | 211-2245 | 3LDK |
| 363724 | AB201 | 2 | T. YAMADA | 331-1123 | 4DK |
| 562354 | AB204 | 2 | T. YAMANAKA | 262-2254 | 2LDK |
| 124376 | AB205 | 2 | S. INOUE | 731-7511 | 3LDK |
| 635422 | AB206 | 2 | M. KATO | 112-2589 | 4DK |
| 321157 | AB301 | 3 | H. OHNISHI | 263-3311 | 4LDK |
| 226172 | AB306 | 3 | Y. NAKANO | 264-5112 | 3DK |

FIG. 6

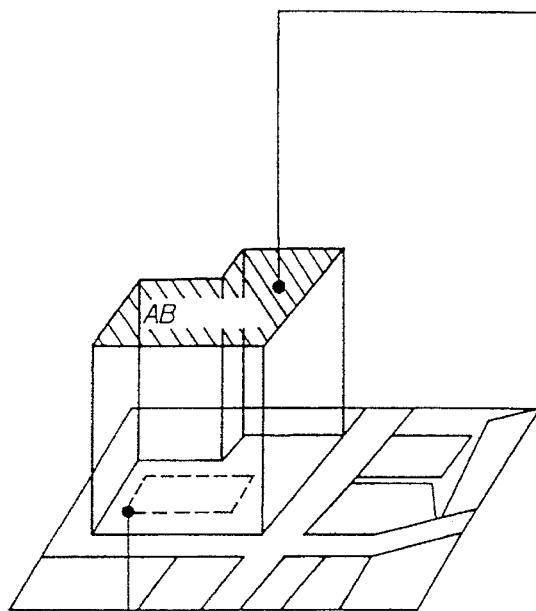

```
┌─(PH3L)──────────────────────────┐
│ Definitions                     │
│ =Polygon 3D : Figure            │
│   Point           // TOTAL NUMBER
│                      OF POINTS
│   *xyz data       // WORLD
│                      COORDINATE
│                      POINT DATA
│   inptr           //
├─────────────────────────────────┤
│ Methods                         │
│ + new             // INSTANCE
│                      GENERATION
│ - a Point         // DATA SETTING
│                      THREE-
│ - display         // DIMENSIONAL
│                      DISPLAY
│   {dispPo yLine3(*xyzdata)}     │
```

```
┌─(PH3T)──────────────────────────┐
│ Definitions                     │
│ = Text : Figure   REFERENCE
│   textX,textY,textZ // COORDINATES
│   *moji           // TEXT CODE
│   height, width   // LETTER HEIGHT
│                      AND WIDTH
├─────────────────────────────────┤
│ Methods                         │
│ + new             // GENERATION OF
│                      INSTANCE LETTERS
│ - initialize      // SETTING OF
│                      LETTER DATA
│ - display         // DISPLAY OF TWO-
│                      DIMENSIONAL
│                      LETTERS
│   {dispText 3(*moji)}           │
```

METHOD OF THREE-DIMENSIONAL DISPLAY OF OBJECT-ORIENTED FIGURE INFORMATION AND SYSTEM THEREOF

BACKGROUND OF THE INVENTION

1. Field of the Invention

The present invention relates to a method of using objects for three-dimensionally displaying figure information and a system therefor. Particularly, the present invention relates to a method for making an effective three-dimensional display of buildings and a system therefor, in addition to a conventional two-dimensional display of a map, for tasks requiring map information such as for facility inspections and urban designing public enterprises and architectural and civil engineering enterprises.

2. Description of Related Art

The following references have been known relating to the present invention. These references are suitably cited in the following explanation of the present invention.

Reference 1: "Map Information Expert System GENTLE", by Shimada and Ejiri, a preparatory draft for the Advanced Database System Symposium in FY 1985, pp 93–101, Information Processing Society of Japan;

Reference 2: "Introduction to Three-Dimensional Graphics based on C Language" by Shigeo Ishii, Gijutsu Hyoronsha, 1985;

Reference 3: "Principles of Database Systems", by Ullman, J. D., Computer Science Press, Potomac, Md., 1980;

Reference 4: "Object-oriented Programming: An Evolutionary Approach", by Brad J. Cox, Addison-Wesley Cop. Inc., 1988;

Reference 5: "Description by Viewpoint and Automatic Processing Propagating Mechanism in Mapping System Manipulating Multimedia", by Shimade, et. al., Proc. Advanced Database System Symposium, 1989;

Reference 6: "Division and Recognition of Superposed Drawings in Multimedia type Power Drawing Information System", by Chikada, Shimada, Miyatake and Matsushima, the national meeting of The Institute of Electronics Information and Communication Engineers of Japan, FY 1988, SD-7-4; and Reference 7: "Application of Map Information—for forming regional appearance" by Goji Sasada, Graphic Processing Information Center, 1983.

As a relevant patent application, a U.S. patent application (No. 07/630,328) titled "Method of Processing Multimedia Data in Multimedia Database and System Therefor" was filed on Nov. 29, 1990. One of the inventors of this relevant application (Mr. Shimada) is also one of the inventors of the present application. The relevant application is incorporated in the present application as a reference.

In recent years, multistory buildings and underground markets have been developed in the metropolitan centers.

In order to identify buildings and houses or to comprehend the layout of shops and stores, three-dimensional display information such as numbers of floors of buildings and numbers of floors of underground markets has been become more important in addition to conventional two-dimensional information such as maps. Under such a situation, in each of public enterprises and architectural and civil engineering enterprises, three-dimensional map displays which take account of heights of buildings as well as figures of the buildings above the ground surface level have come to be required because using only conventional two-dimensional map displays is not sufficient for performing works such as facility inspections and urban designing for which maps are used.

In order to meet these requirements, various kinds of three-dimensional bird's-eye displays using design data have already been carried out in the field of an architectural CAD, as shown in the reference 7. In the architectural CAD, data of buildings and the like are converted into in complete three-dimensional data and stored in a data base. By using these data the buildings and highways can be displayed in a three-dimensional manner when they are viewed from any desired direction.

Therefore, a method would be considered wherein various attribute data of the buildings having three-dimensional characteristics are displayed in one-to-one corresponding relation with the buildings, after the three-dimensional bird's-eye display is made.

Further, a method of applying shading to the display considering a light source has been progressed recently, in addition to a mere three-dimensional display using a wire frame, so that a more realistic display has gradually been made possible.

However, in application of the method shown in the above reference 7 to a map information system as an example of a figure information system, it is necessary to obtain figure data of building as data of complete three-dimensional coordinate system (x, y, z) as in the architectural and civil engineering CAD. Therefore, the following three problems exist.

As the first problem, in the case of a map information system, there is a heavy load when displaying various kinds of attribute information in correspondence with figure elements on a two-dimensional display of map data which include a large amount of figure elements such as roads and house frames. Therefore it is not practical for a complete three-dimensional display of the map data as in the architectural CAD system. In other words, it is assumed that the map data is merely stored in a data base which map data includes coordinate data indicative of figures of roads and buildings, and symbols for churches, banks, and the like, and texts for display. Therefore, in the case of retrieving attribute data by using a displayed building or text as a key for the retrieval, a z-coordinate in the height direction needs to be searched for route search processing and search processing within a near range in addition to two-dimensional coordinates (x, y). Therefore, a time for executing various retrieval processings is expected to become extremely long.

As the second problem, in a map information system, in order to obtain complete detailed values of three-dimensional coordinates for buildings as defined in the architectural CAD system, it is necessary to obtain such detailed data by searching each building, resulting in an enormous amount of search processes. Therefore, it is almost impossible to completely build a three-dimensional data base for this purpose.

As the third problem, in the case of displaying various kinds of attribute data on the above three-dimensional display, it is expected to be extremely difficult to confirm at a later stage corresponding relation relationship between buildings and attributes.

SUMMARY OF THE INVENTION

It is an object of the present invention to provide a three-dimensional display of figure data such as map data while minimizing load for retrieval processing or a display.

In order to achieve the above object, according to the present invention, two-dimensional digitized map data which can be obtained relatively easily by utilizing an aerial photograph or the like and the number of floors of a building that has been searched and put into a data base as an attribute of the building are used in an object manner and an absolute value of the height of the building is estimated, thereby resulting make an artificial three-dimensional bird's-eye display.

According to the present invention, the three-dimensional bird's-eye display can be provided under conditions of a desired viewpoint and a desired angle in a map of a wide range. Therefore, the present invention can significantly contribute to improving efficiency of various works using maps such as inspections of facilities by public corporations and metropolitan projects by architectural and civil engineering enterprises.

BRIEF DESCRIPTION OF THE DRAWINGS

FIGS. 2A and 2B are diagrams showing figure data and text data, stored in a map data base respectively;

FIG. 3 is a diagram showing attribute data;

FIG. 6 is a diagram showing a relation among a three-dimensional display of the map, the figure entity object and the text entity object;

DESCRIPTION OF THE PREFERRED EMBODIMENTS

A figure information system of the present invention will be explained below with reference to the accompanying drawings, taking a map information system as one example.

Figure 1:
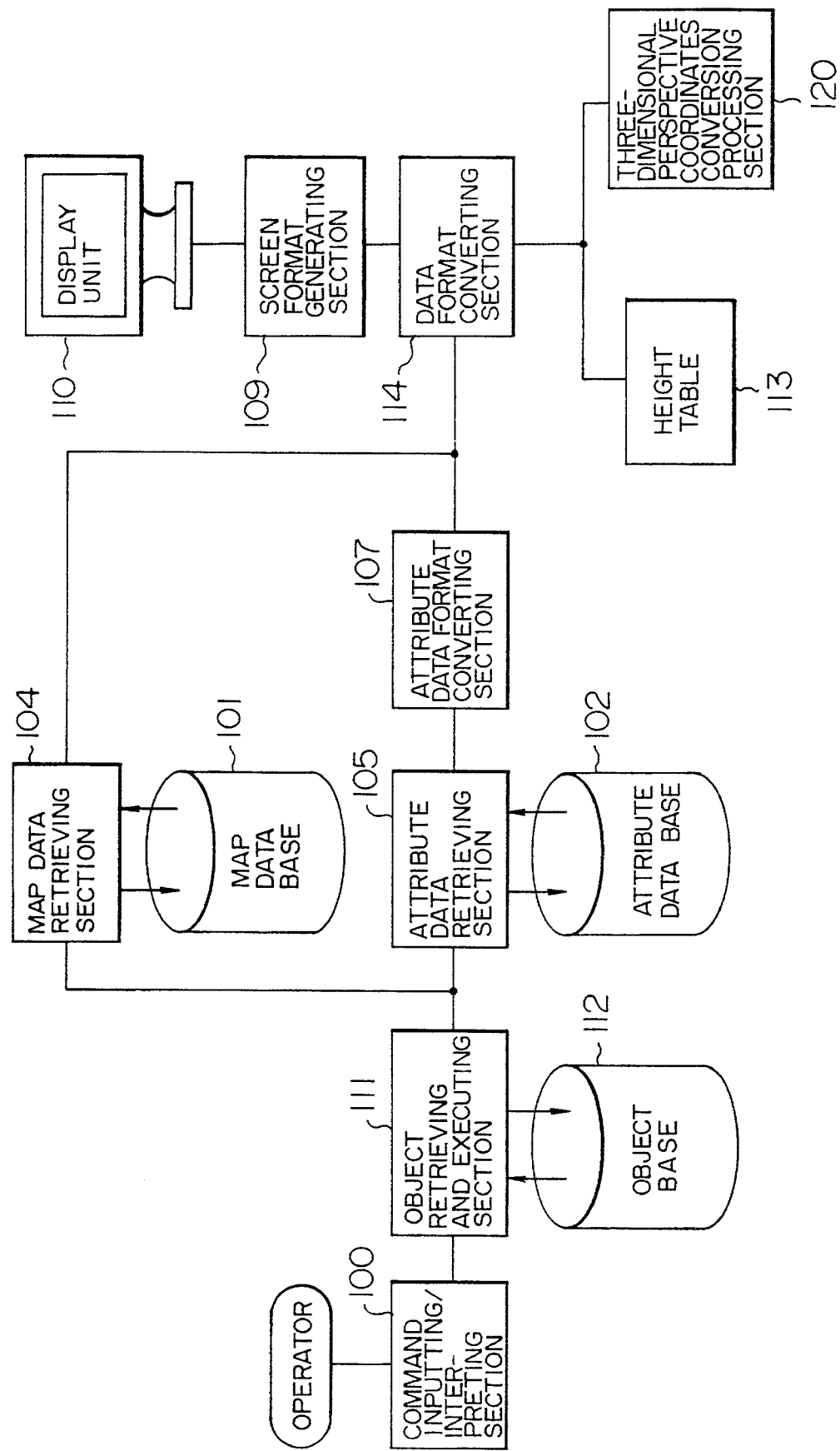
FIG. 1 is a block diagram showing a functional structure of a map information system according to the present invention.

FIG. 1 is a block diagram showing a functional configuration of the map information system. The system includes generally four sections, that is, an operation section, a processing section, a data base section and a display section. The operation section includes a command input and interpretation portion 100 for receiving a command from an operator shown at the left of FIG. 1 and interpreting the content of the command. The display section includes a screen format generating section 109 and a display unit 110 such as a CRT as shown at the right of FIG. 1. The data base section includes a map data base 101 for storing map data including data of various elements corresponding to figures and texts displayed on the display screen, an attribute data base 102 for storing attribute data or data associated with map data having three-dimensional characteristics and indicating attributes of each house, e.g., {number of floors, a residential number, owner of the house, telephone number, as etc.}, and an object base 112 for storing, in an object format, information indicating relationship between objects and media such as the map data and the attribute data. Each data base is stored in a different file.

The processing section includes a object retrieving and executing section 111, a map data retrieving section 104, an attribute data retrieving section 105, a an attribute data format converting section 107, a data format converting section 114, a height table 113, and a three-dimensional perspective coordinates conversion processing section 120. The retrieving and executing section 111 retrieves and executes entity objects from a plurality of objects, in accordance with the result of an interpretation by the section 100. The retrieving section 104 retrieves map data in accordance with the execution of a map data entity object. The retrieving section 105 retrieves attribute data in accordance with the execution of a attribute data entity object. The converting section 107 matches the display format of the attribute data to that of map data. For example, the display position of the attribute data is matched to that of the map data. The converting section 114 converts the formats of the map data and attribute data. For example, in the case of the three-dimensional display, height data is obtained by referring to the table 113, and the map data and the attribute data are converted to three-dimensional data. When a bird's-eye display has been instructed, the section 114 initiates the processing section 120 so as to convert the coordinate system of the three-dimensional data from a world coordinate system to a viewpoint coordinate system. The height table 113 stores height data per one floor which has been determined in advance in accordance with types of figure data as a display element of the map data. Accordingly, when the section 114 refers to the table 113 in accordance with the types of display elements and the number of floors, the height of the display element can be obtained.

Description will be made of an outline of a flow of a series of processings from data retrieval to a three-dimensional display which are to be carried out under the above-described structure when an operator has issued a request for making a three-dimensional bird's-eye display of a portion of a map. When an operator has issued the request for designating a range of the retrieval and for processing the retrieval or editing to the section 100, the section 100 converts the request into a message for an object and supplies the message to the retrieving and executing section 111.

When a message has been given to one among relational object groups which exist for each types of processing in the object base 112, necessary number of messages are transferred to entity objects in accordance with a procedure in a relational object, so that each entity object initiates the retrieving section 104 or 105 so as to retrieve the content of the data base 101 or 102. First, the retrieving section 104 retrieves map data of an area from the map data base 101 and converts the map data into display data. The retrieving section 105 retrieves three-dimensional attribute data having a corresponding relationship with the retrieved map data from the attribute data base 102, and the converting section 107 converts the data format of the retrieved attribute data into a data format which corresponds to the retrieved map data. The section 114 refers to the table 113 in accordance with the display format of data, and causes the section 120 to convert the data format. The generating section 109 converts the formats of the map data and attribute data as the display data from the section 114 into formats that fit the screen, and displays the data on the display unit 110 such as a CRT. As described above, the data bases 101, 102 and 112 of the map information system are divided into three data files. The map data and attribute data that have been indirectly extracted by being related to the relational object stored in the object base 112 are displayed in accordance with the processing procedures exclusively used for the media, respectively.

Separate from the above series of processings, in order to retrieve the map data and the attribute data, it is necessary to convert each of the contents stored in the data bases 106 and 108 into an object and transfer the converted object, to the object base 112 to store it therein. The contents of the data bases 101 and 102 necessary for a three-dimensional display are retrieved and extracted by the retrieving sections 104 and 105, respectively, and are converted into objects by the section 111 such that the objects are stored in the object base 112. This series of processing is carried out whenever required and is processed at a time different from that of the processing from the issuance of the request for retrieval from an operator to the three-dimensional bird's-eye display.

Figure 5:
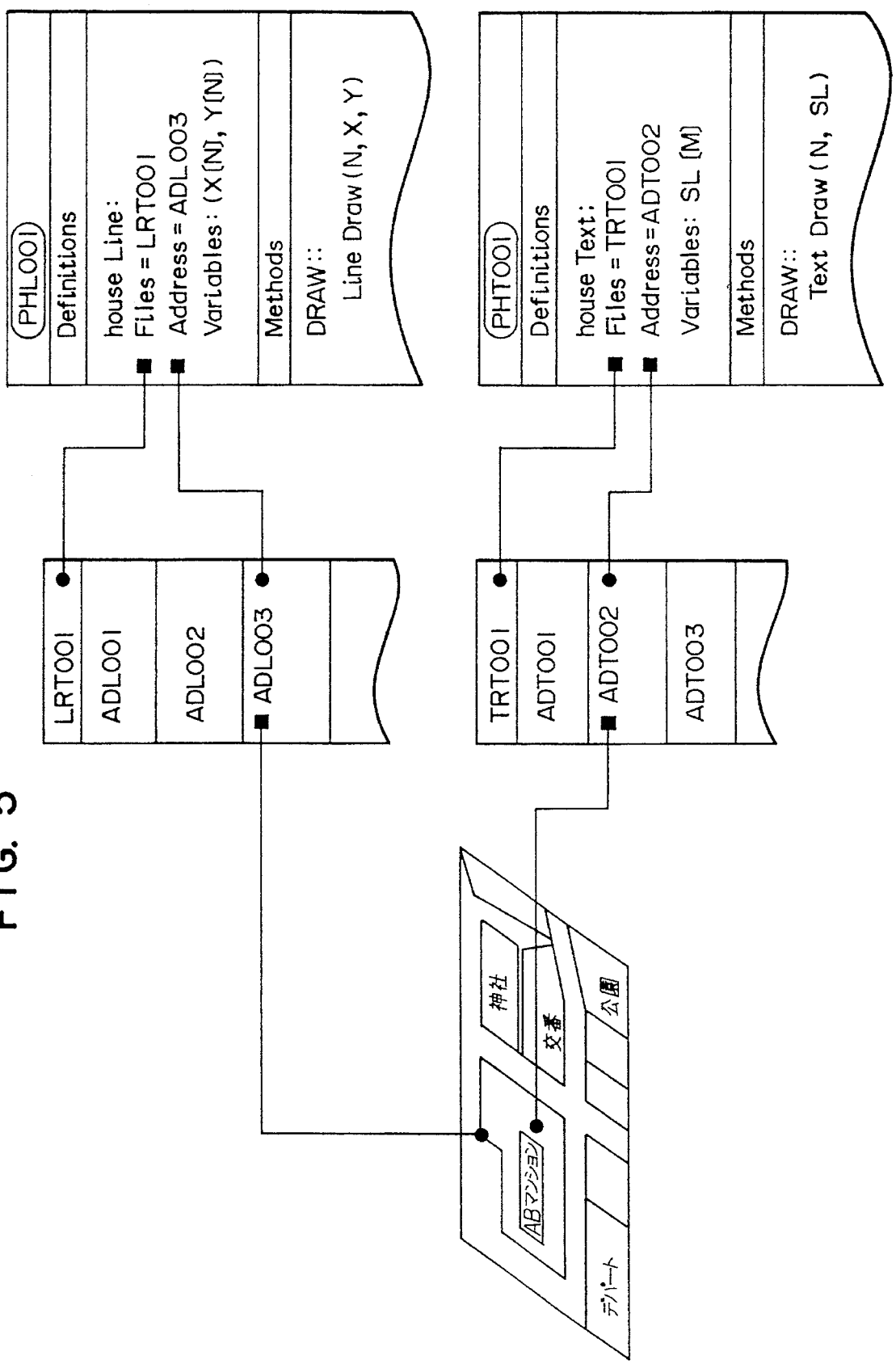
FIG. 5 is a diagram showing a relation among a two-dimensional display of a map, a figure entity object and a text entity object corresponding to a house.
Figure 7:
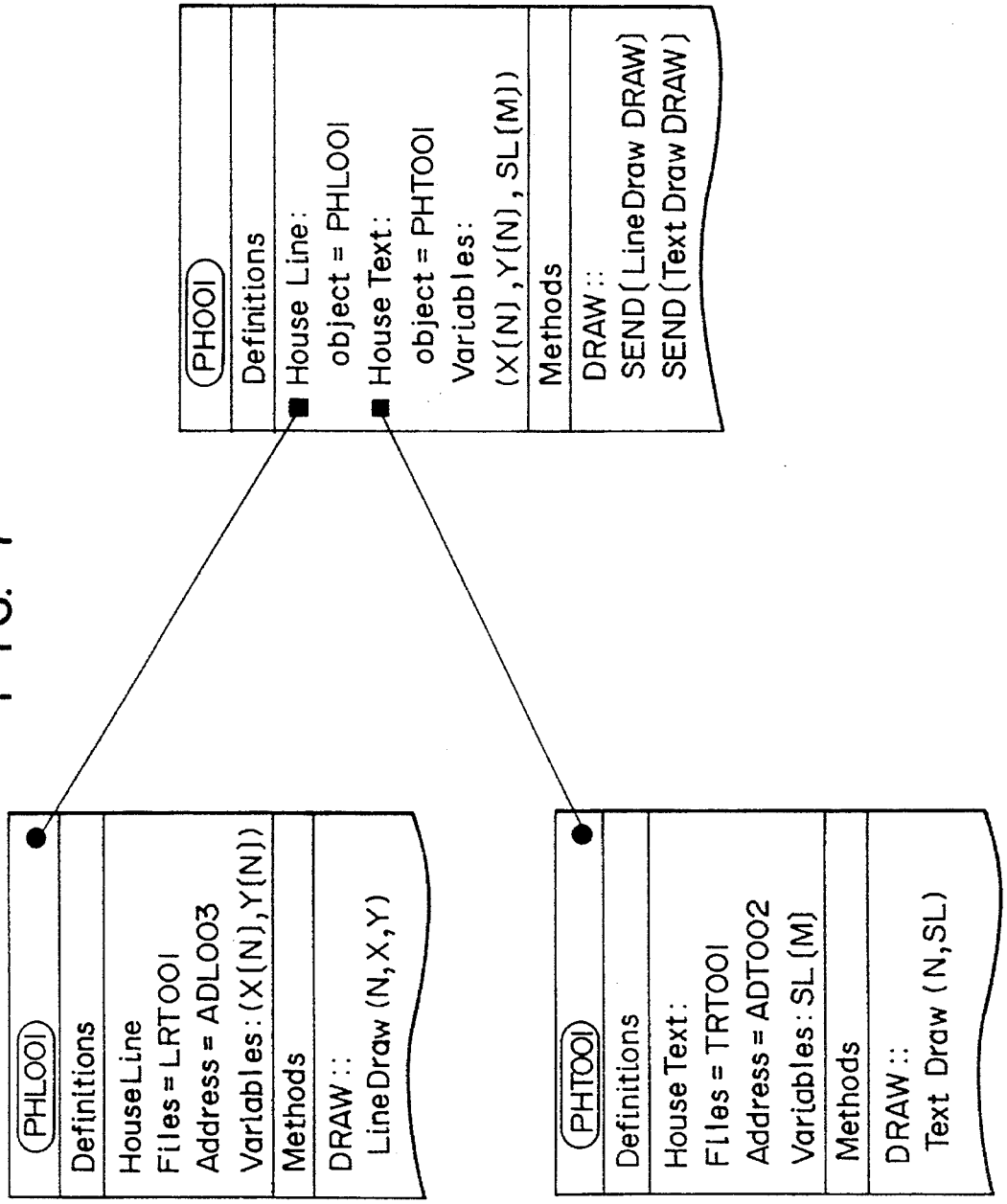
FIG. 7 is a diagram showing a relation among a relational object, the figure entity object and the text entity object.

FIGS. 5 and 7 show the contents of the three data bases 101, 102 and 112 relating to the map displayed on the display unit 110. The map data base 101 stores figure data of roads and house frames and text data for names of places, which are necessary for displaying a normal two-dimensional map. The object base 112 stores entity objects, each of which corresponds to a content of each of data bases 101 and 102, and relation objects which describe relations between the entity objects.

Under the above-described system configurations and process flows, the data structure of each data base will be explained in sequence.

The map data is divided into a figure portion and a text portion as shown in FIGS. 2A and 2B respectively. Each data portion is of a sequential format of a variable length. The figure portion in FIG. 2A is composed of a figure table header and records. A file size of the whole figure portion and the number of records are stored in the file table header, and in each record are stored data indicative of the number N1 of constituent points of coordinates that constitute a figure, a type of line KL, for designating a type of the figure, and a color in drawing the figure and so on; information SI, and EI, indicative of a starting point and an ending point of the figure necessary for knowing a state of processing in editing; and X coordinates and Y coordinates $(X_1, Y_1, \ldots X_M, Y_M, \ldots XN_1, YN_1)$ for the number of constituent point.

The text portion is composed of a text table header and records. A file size of the whole text portion and the number of records are stored in the file table header, similar to the figure portion, and in each record are stored data indicative of the number $M_1$ of constituent letters which constitute a text, a type of text $KT_1$ for determining a font of the text such as a classic Chinese letter font or a Gothic letter font, a box width W1 and a box height $H_1$ for giving a width of a circumscribed rectangle relating to the size of each text letter, a slope angle $V_1$ of each text letter within the circumscribed rectangle, a rotation angle $R_1$ for rotatingly displaying a plurality of letters as a text, a flag $F_1$ for controlling the direction vertically or laterally displaying the text, X coordinates $X_1$ and Y coordinates $Y_1$ of a reference point indicative of a reference position for displaying each text, and text code data $(TC_1, TC_2, \ldots, TCM_1)$ for each text.

The attribute data base 102 is structured of resident attribute data having three-dimensional characteristics, and this is a relational data base as shown in the reference 3 which can store and manage various types of attribute values in each resident unit. As shown in FIG. 3, items {a resident identifier, a residence number, a number of floors, a name of the owner, etc.} are set in the lateral direction of the attribute data base, and attribute values of each resident are stored and managed in the vertical direction thereof. By the above arrangement, conditional retrieval subject to each item of attributes, which is a feature of the relational data base, becomes possible. For example, a conditional retrieval for retrieving names of residents living in the second floor of a house with 3DK (three living rooms and a dining kitchen room) becomes possible by using a structured query language (SQL) which is a standard language for a retrieval procedure shown in FIG. 3.

Figure 4:
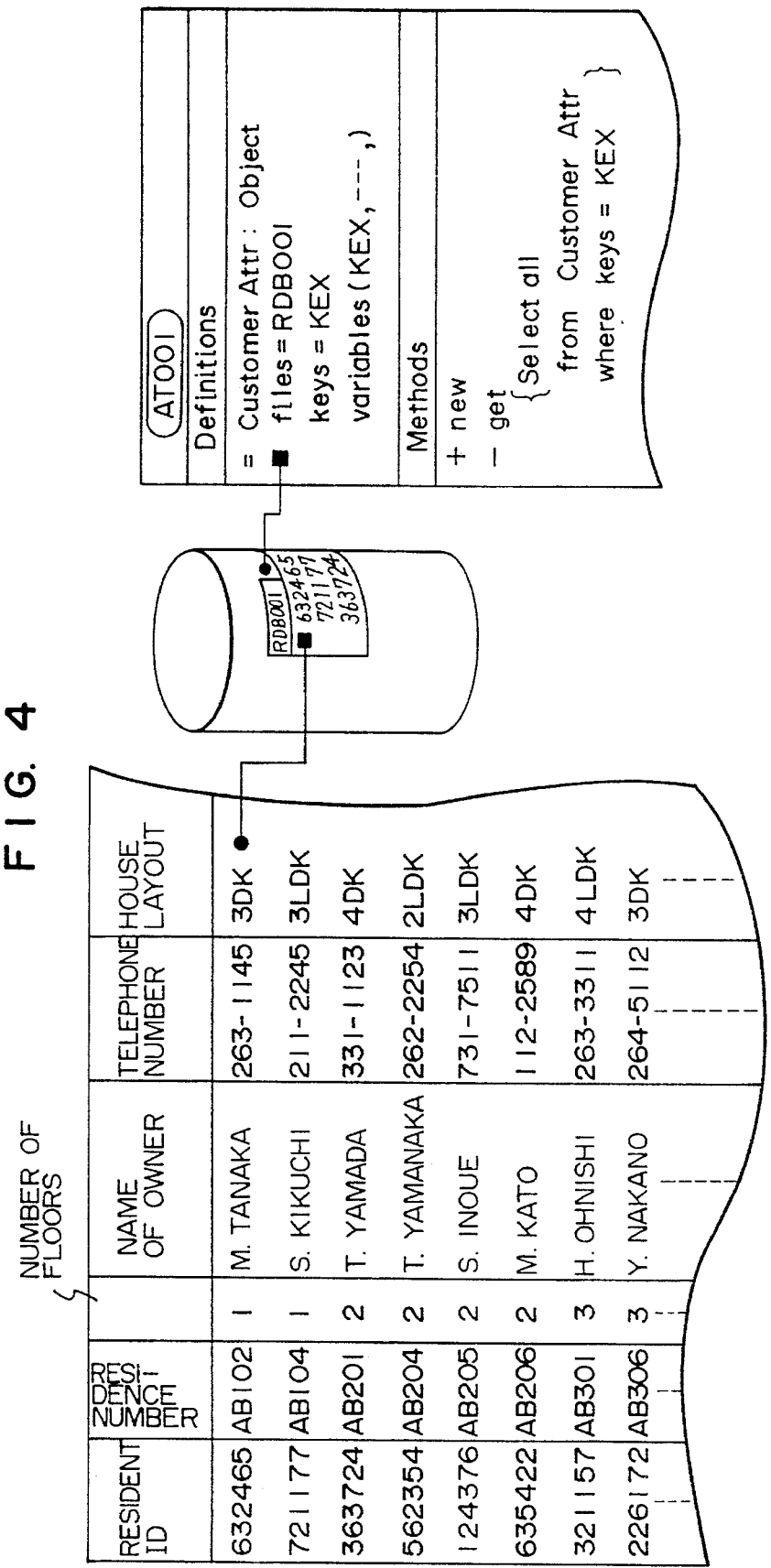
FIG. 4 is a diagram showing a relation between an attribute entity object and attribute data.

Before describing the structure of the object base 112, definition and characteristics of an object in the present embodiment will be made clear. In general, an object defines a capsuled unit of defined data and a procedure for directly processing the data, as shown in FIG. 4. Usually, an object refers to a unit which can be described in an object-oriented language as shown in FIG. 4. The structure of objects includes classes, in each of which a common concept can be defined hierarchically and instances, in each of which the definition of each class is expressed in an inherent value. A class can generate inherent instances when necessary, and a group of instances generated by the same class can hierarchically inherit and share definitions of variables and procedures of the class. For example, an object can be described in the following format by using an object-oriented language, objective-C, which is shown in FIG. 4:

```
object = name of a class: super-class name (message:
group 1, group 2, . . . )
{declaration of an instance variable}
+ a single term selector {a factory method definition}
− a single term selector {an instance method definition}
+ selector 1: a temporal argument 1, a selector 2:
a temporal argument 2, . . . {a definition of a class
method}
− a selector 2: a temporal argument 1, a selector 2: a
temporal argument 2, . . . {a definition of an instance
method}.
```

In the above description, the factory method defines a detailed procedure for generating an instance by each class. In the case of Objective-C, the procedure is described in the C language. A selector is an identifier which is necessary for receiving a message to make a request to each method, and a single-term selector means a selector having only one identifier.

From the viewpoint of describing multimedia such as figures and images, objects can be classified into entity objects and relational objects, as shown in FIG. 5. An entity object is a description of set of definition of data and processing procedure for the media data, the media data being a single kind of media itself such as a figure or an image. On the other hand, a relational object is for relating a plurality of media including resident attributes and figures of house frames or among a plurality of other relational objects and is a description of a combination of pointer information to entity objects and procedures for mainly issuing a message to each entity object.

First, the structure of an entity object will be explained based on an example of description of the entity object from the viewpoint of making a three-dimensional bird's-eye display of a house frame designated on a housing map.

FIG. 5 shows a structure of a figure entity object PHL001 indicative of a house frame and a structure of a text entity object PHT001 in correspondence with map data. A figure record and a text record, which correspond to a house frame of each resident, are described in a table file LRT001 which structures the figure portion of the map data and in a table file TRT001 which structures the text portion shown in FIGS. 2A and 2B, respectively. Each of the figure and text records can be independently accessed in accordance with address information ADL001, ADL002, . . . , ADT001, ADT002, . . . for indicating a position of the record in the table file of variable length and the number of constituent points or texts in the record. Of the figure entity object PHL001 of the house frame, in the "Definitions" section are defined a file pointer Files=LRT001, a record pointer Address-ADL003 and entity variables X[N] and Y[N], and in the Methods is described a procedure Line Draw (N, X, Y) for displaying a figure of the house frame. On the other hand, of the text entity object PHT001 of the house frame, in the Definitions are defined a file pointer Files=TRT001, a record pointer Address=ADT002 and an entity variable SL[M], and in the Methods is described a procedure Text Draw (N, SL) for displaying a text string for the house frame. Therefore, by giving only a message DRAW for a display request to these objects, the procedures Line Draw (N, X, Y) and Text Draw (N, SL) in the Methods of the objects are initiated to display the house frame and the text string on the display unit 110.

FIG. 6 is a diagram showing an example of a three-dimensional bird's eye display of an apartment house AB of the map data shown in FIG. 5. In response to a command of a bird's eye display in a map data entity object, reference height data is obtained by referring to the height table 113 in accordance with the floor data of the apartment house AB of the attribute data, and the reference height data is multiplied by the number of floors so as to obtain the height of the apartment house AB. Next, the three-dimensional map data and attribute data are sent to the section 120 which carries out a conversion processing. The result of the processing is displayed on the display unit 110 through the section 109. The display position of the attribute data, e.g., the display position of the text data "AB apartment house" is altered by the section 107 from the position shown in FIG. 5 to the position shown in FIG. 6 to match the three-dimensional display of the map data.

FIG. 4 shows a structure of an attribute entity object AT001 of a resident. As shown in FIG. 3, the attribute data base is of a relational structure having attribute items in the lateral direction and individual personal data in the vertical direction, and can be accessed independently for each column. The object AT001 includes pointer information such as a pointer for an attribute data file, Files=RDB001, and a pointer Keys=KEX as a pointer indicative of the position of an objective record in the file in the Definitions and a retrieving procedure in a record unit subject to a retrieval language SQL for the relational data base in the Methods. Accordingly, in order to retrieve attribute data of one record for a resident having KEX as a resident ID, by only sending of a retrieval request message GET having a parameter of KEX to the object AT001, the retrieving procedure in the object AT001 is initiated, to thereby obtain attribute data.

The above describes the structure of an entity object closely related to each media. A relational object is also stored in the object base 112. As described already, the relational object is for making a meaningful relation among a plurality of media for purpose of three-dimensionally grasping residents within an apartment. The relational object describes a combination of pointer information for relating necessary ones among the entity objects described above and corresponding procedure mainly for transferring a message to each entity object. Once the object PH001 for showing houses has been generated. In order to simplify the internal structures of relational objects of a hierarchical structure, there are some relational objects which intermediately group entity objects for media of the same kind.

Figure 12:
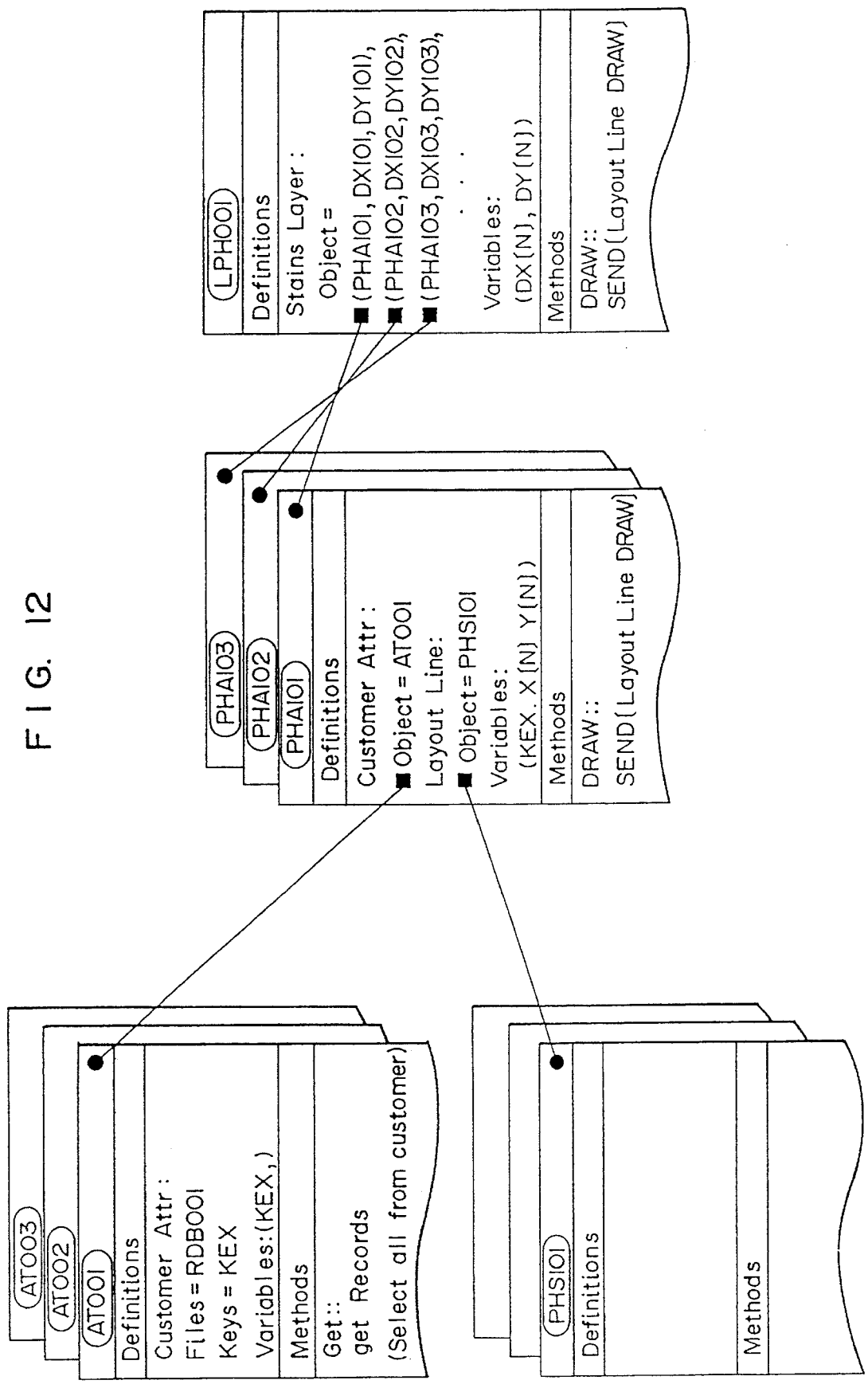
FIG. 12 is a diagram showing a hierarchical structure relational objects and entity objects.

FIG. 7 shows a relation object PH001 for relating the figure entity object PHL001 and the text entity object PHT001 of the house frame shown in FIG. 5. When a message DRAW for requesting a display is given to the object PH001, the messages given to the Methods of object PH001 are transferred to the objects PHL001 and PHT001, which are defined in the Definitions of the object PH001, by a message transfer function between objects, thereby to initiate the procedure Line Draw of the object PHL001 for displaying and a house frame the procedure Text Draw of the object PHT001 for displaying a house name. As a result of generating the object PH001, the house frame and house name can be displayed. Thus, the structure of the relational object PH001 can be simplified. As shown in FIG. 12, a group of entity objects (PHS101, PHS102, . . . ) for data concerning houses or rooms within an apartment and a group of attribute entity objects of individual persons (AT001, AT002, . . . ) are related to generate a group of relational objects (PHA101, PHA102, . . . ). Further, the objects associated with the same floor of the operational are grouped to generate a relational object LPH001. By this, the structure of the relational object LPH001 can be further simplified.

Lastly, when a relational object H0001 for summarizing media meaningful for the apartment is generated, the object H0001 relates the groups of entity objects (PHS101, PHS102, . . . ), (AT001, AT002, . . . ) and (PHL001, PHT001, . . . ) corresponding to each media described above, to the groups of relational objects (PHA101, PHA102, . . . ), (LPH001, LPH002, . . . ) and (PH001, PH002, . . . ) which are the result of having grouped the entity objects at an intermediate stage. Further, the procedure portion thereof describes a transfer procedure for transferring a message for each entity object. Thus, in order to display map data of the apartment, the message DRAW is given to the object H0001 with the selectors Line Draw and Text Draw.

Figure 8:
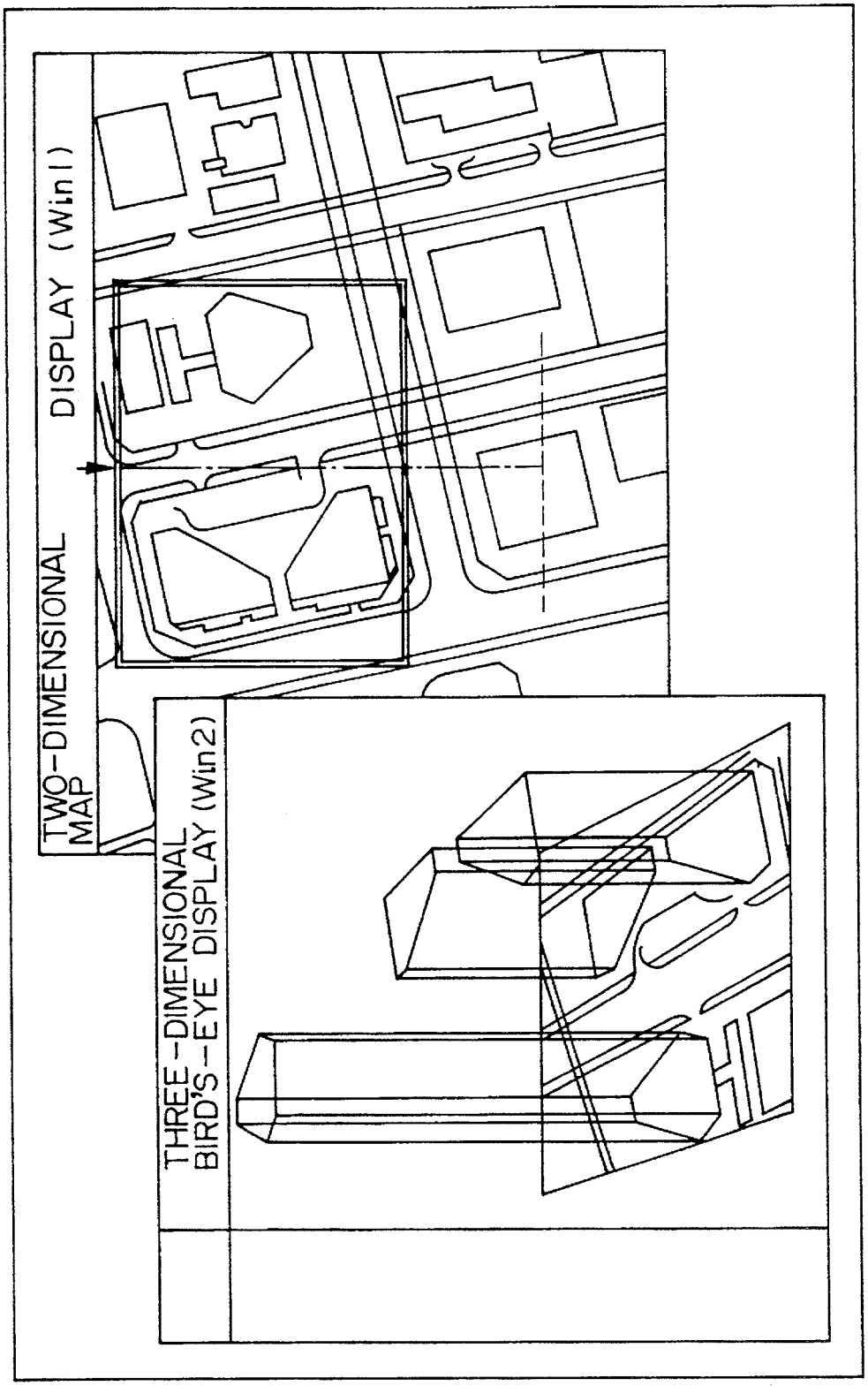
FIG. 8 is a diagram showing an example of a three-dimensional bird's-eye display in a window of a display unit.

Next, a method will be described for making a bird's-eye display of a map from an arbitrary direction, by using the objects of map data and attribute data explained above. In the method, when an area required for making a three-dimensional display on a two-dimensional display of a map is designated, only figure elements of the map within the area are converted in a three-dimensional perspective manner and the bird's-eye display is made. FIG. 8 shows an example of the screen of the display unit 110 in which a three-dimensional bird's-eye display is made by extracting necessary figure elements from a conventional two-dimensional map display.

First, when it is interpreted by the section 100 that a menu for the three-dimensional display is selected from a menu list by an operator by pointing to the menu with a mouse, for example, a relational object for the three-dimensional display is selected from the object base 112 by the section 111. Subsequently, as shown in FIG. 8, a rectangle area of a window Win1 surrounded by a double line is designated and input to the section 100 by the operator using the mouse so as to specify figure elements for the three-dimensional display. Since the displayed area on the display unit 110 and reference coordinates of the displayed area are already known, the designated area and the figure elements in the designated area can be specified. Names of objects for the specified figure elements are set in the Definitions of the selected object by the section 111. Further, the operator then designates a viewpoint vector defined by the direction of an arrow shown above the window Win1 in FIG. 8, a height and a distance to a projected plane for three-dimensional perspective conversion. These values are also set in the selected object as parameters. Then, a command DRAW is issued from the section 100 to the section 111. In response to the command DRAW the selected relational object is initiated and commands written in the Methods are sequentially propagated from the selected relational object to figure entity objects and attribute entity objects through relational objects. When the figure entity objects are initiated, data records of the figure elements such as figure frames of buildings included in the designated area are retrieved from the map data base 101 by the section 104. In addition, when the attribute entity objects are initiated, the attribute data base 102 is searched by the section 105 to obtain texts of names of the buildings, types of the buildings and numbers of floors of the buildings. Positions of the texts to be displayed are linked to those of the figure elements by the section 107. By referring to the table 113 in accordance with each of the building types and multiplying the number of floors with data indicative of a predetermined height per one floor obtained from the table 113, the section 114 obtains an absolute height of each of the buildings to be displayed, to thereby obtain complete three-dimensional coordinate data relating to the buildings. Under the above condition, three-dimensional coordinate data of the buildings are converted into perspective data, and the result is displayed in the window of a three-dimensional bird's-eye display (Win2). By changing the valves of the parameters for perspective conversion, a bird's-eye display viewed from a desired direction is made possible, and an effective display for a simulation of an urban design is also made possible. It is also possible to directly convert the whole screen of a map into a three-dimensional perspective view to have a bird's-eye display by omitting the step of designating an area for the three-dimensional display as shown in FIG. 8. In the present embodiment, an emphasis has been placed on the process of temporarily making a three-dimensional display of only a necessary portion. Therefore, it is not always necessary to provide the two-dimensional display screen and the three-dimensional bird's-eye display screen simultaneously on the display unit 110, as shown in FIG. 8.

Figure 9:
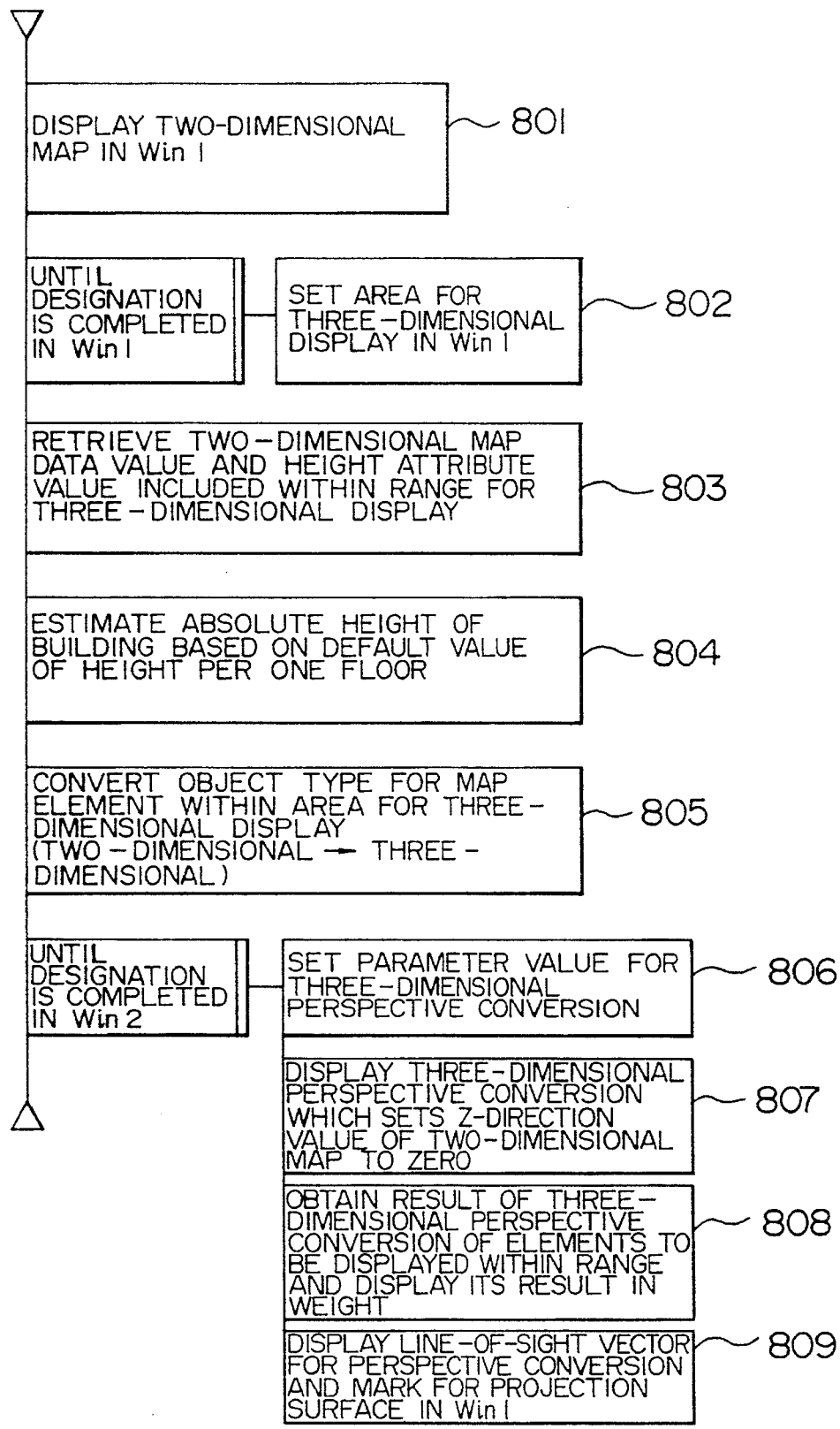
FIG. 9 is a diagram showing a flow of algorithm for the the-dimensional bird's eye display.

FIG. 9 is a flow chart (in a PAD format) for explaining the above-described three-dimensional display procedure. Each process will be explained in the order of the steps FIG. 9. In step 801, the whole of map data to be processed is read out from the data base 101 by the section 104, and is two-dimensionally displayed in the window Win1 on the display unit 110 through the sections 114 and 109. This data is the map data stored in the map data base 101. In step 802, an area to be three-dimensionally displayed out of the displayed map data in the window Win1 is designated. The area is designated by the operator through a pointing device such as a mouse operated on the window Win 1, and a result of the designation is supplied from the section 100 to the section 111. In step 803, determination is made whether each polygon vector is included in the designated area based on the figure data of house frames, etc. of figure entity objects stored in the object base 112. Based on the result of the decision, figure entity objects and text entity objects are extracted from the object base 112. For the attributes of the types of buildings and numbers of floors, attribute objects related to the extracted entity objects are referred to by the section 105 and are supplied to the section 114. The section 114 obtains a maximum value of the attribute of the number of floors related to the same type of building. In step 804, the section 114 refers to the height table 113 and obtains height values of the buildings from the table 113, in which the height data per one floor are stored in advance in accordance with the type of the building. In order to obtain absolute heights of the buildings for the three-dimensional display, maximum numbers of floors of the buildings and the height values obtained up to the step 803 are respectively multiplied to artificially estimate the absolute heights of. As described above, more accurately estimated values of the absolute heights can be obtained if average height per floor to be stored in advance is set for a type of building such as a warehouse, an office building, etc. In step 805, the section 114 converts a data structure of each display element included within the designated area. The map data to be extracted in the above steps are in the form of two-dimensional entity object as shown in FIG. 1. In the subsequent steps, these data are converted into the format of three-dimensional entity object as shown in FIG. 6. In the present embodiment, three-dimensional objects of the format of FIG. 6 are prepared by the number of objects extracted, and the corresponding portions are copied directly. The estimated value of the absolute height of each building obtained in the preceding steps is used as a substitution for Z coordinates. On the window Win2 for carrying out the three-dimensional display, elements of the map data for the three-dimensional display are processed perspectively to obtain a bird's-eye three-dimensional coordinate system. In step 806, parameters which are necessary for the conversion processing are set by the section 100. Details of the three-dimensional perspective conversion are explained with reference to a model having three coordinate systems as shown in FIG. 10.

Figure 10:
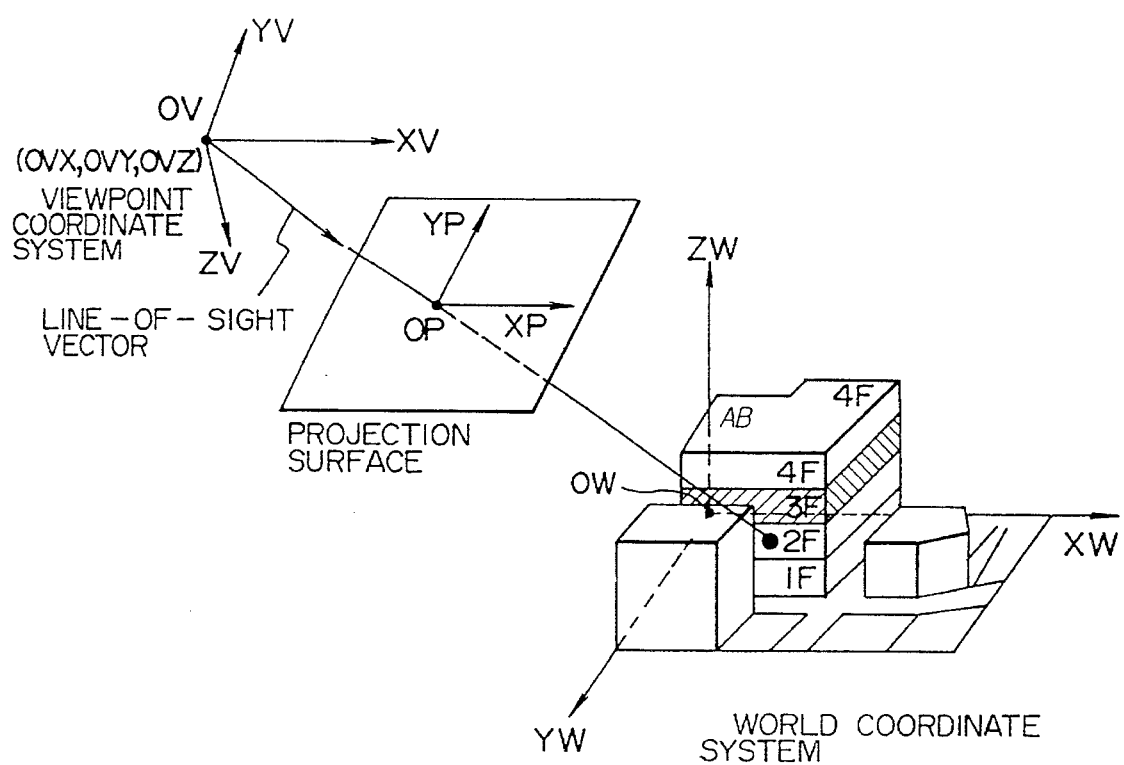
FIG. 10 is a view for explaining coordinate conversion from a world coordinate system to a viewpoint coordinate system; FIG.

In FIG. 10, a group of three-dimensional figures to be perspectively converted is described as wC:[xW-YW-ZW] in a world coordinate system. These coordinates are to be converted on a viewpoint coordinate system VC:[XV-YV-ZV]. As an assumption of FIG. 10, a viewpoint position on the viewpoint coordinate system VC is at a position of (OVX, OVY, OVZ) in the world coordinate system WC and a line-of-sight vector for looking at the three-dimensional figure group in the direction cosine (HX, HY, HZ) from this viewpoint is assumed. Further, the line-of-sight vector intersects at an angle of $\alpha$ degrees with a [YV-ZV] plane in the viewpoint coordinate system VC, and the line-of-sight vector intersects at an angle of $\beta$ degrees with the [YV-ZV] plane. In other words, the direction cosine and $\alpha$ and $\beta$ have the following relation;

$$\cos\alpha = HZ/\sqrt{HX+HZ} \quad \sin\alpha = HY/\sqrt{HY+HZ}$$

$$\cos\beta = \sqrt{HY+HZ} \ /\sqrt{HX+HY+HZ}$$

$$\text{SIN}\beta = HX/\sqrt{HX+HY+HZ}$$

In this case, in order to carry out the perspective conversion, the following four conversion matrices are obtained and the conversion processings are applied sequentially.

(1) Carry out a parallel displacing conversion TD to match the viewpoint position with the origin of the viewpoint coordinate system VC.

(2) Carry out a coordinate axis rotating conversion RX for rotating around the XV axis by degrees so that the viewpoint vector is included in the [XV-ZV] plane of the viewpoint coordinate system VC.

(3) Carry out a coordinate axis rotation conversion RY for rotating around the YV axis by β degrees so that the ZV axis becomes parallel with the line-of-sight vector.

(4) Carry out a coordinate axis rotating conversion for converting the ZV axis in an opposite direction.

The content of the conversion matrix to be used for each of TD, RX, RY and RZ is as follows $$TD = \begin{bmatrix} 1 & 0 & 0 & 0 \\ 0 & 1 & 0 & 0 \\ 0 & 0 & 1 & 0 \\ -VX & -VY & -VZ & 1 \end{bmatrix}$$

$$RX = \begin{bmatrix} 1 & 0 & 0 & 0 \\ 0 & \cos\alpha & -\sin\alpha & 0 \\ 0 & \sin\alpha & \cos\alpha & 0 \\ 0 & 0 & 0 & 1 \end{bmatrix}$$

$$RY = \begin{bmatrix} \cos\beta & 0 & \sin\beta & 0 \\ 0 & 1 & 0 & 0 \\ \sin\beta & 0 & -\cos\beta & 0 \\ 0 & 0 & 0 & 1 \end{bmatrix}$$

$$Z = \begin{bmatrix} 1 & 0 & 0 & 0 \\ 0 & 1 & 0 & 0 \\ 0 & 0 & -1 & 0 \\ 0 & 0 & 0 & 1 \end{bmatrix}$$

Another representing format of an object will be described below.

Figure 11:
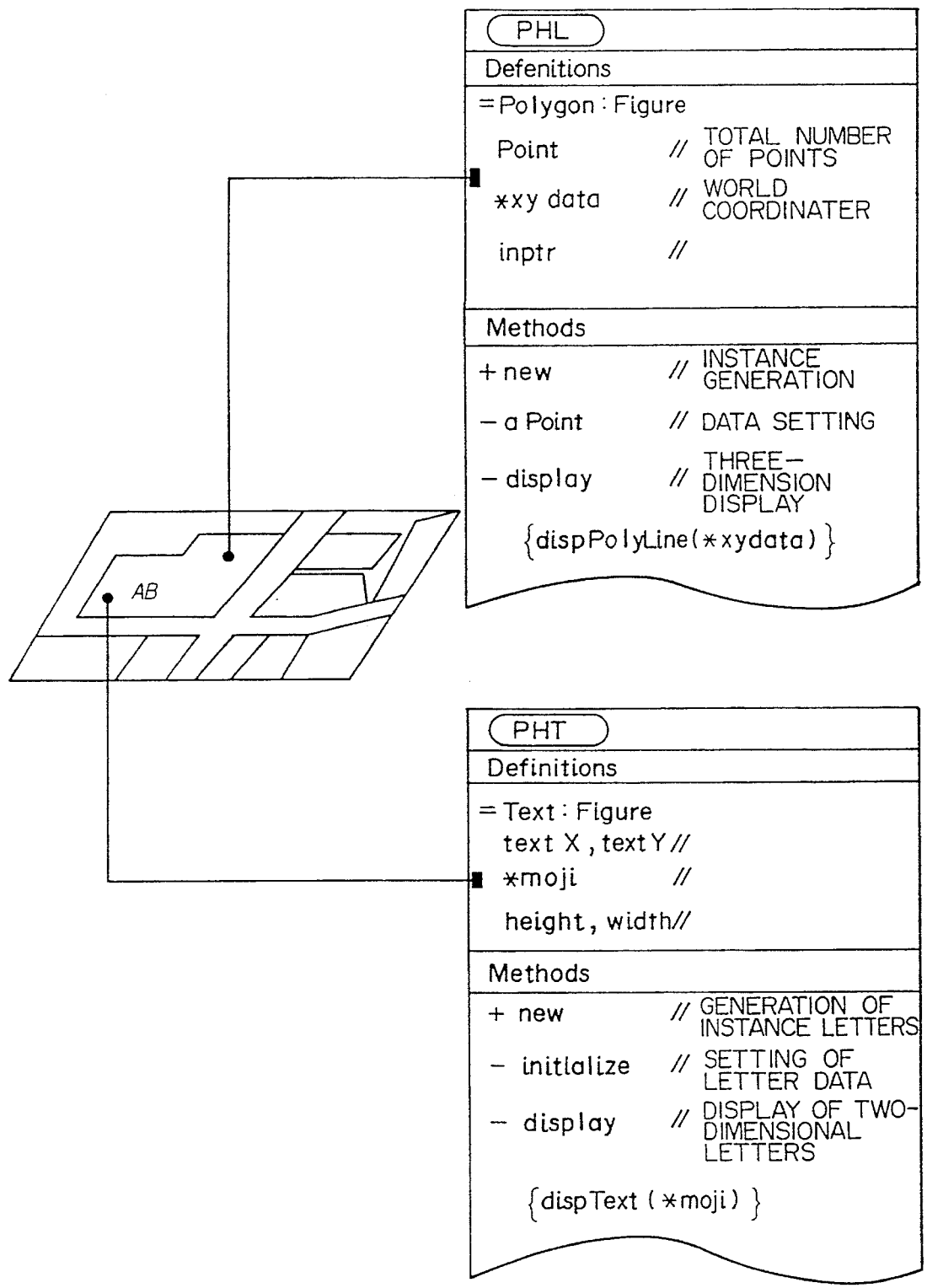
FIG. 11 is a diagram for showing another expression format for expressing an entity object shown in FIG. 5.

FIG. 11 shows a structure of a figure entity object PHL indicative of a house frame and a structure of a text entity object (PHT) in correspondence with the map data. A figure record and a text record, which correspond to a house frame of each resident, are described in a table file LRT001 which structure the figure portion of map data and in a table file TRT001 which structures the text portion shown in FIGS. 2A and 2B, respectively. The figure and text records are stored in the figure entity object PHL for a house frame and the text entity object PHT showing the name of a house. For example, in a Definition portion of the object PHL, a number of constituent points of the figure portion shown in FIG. 2A is filled in point and coordinates of a starting point, a bending point and an ending point are filled in * xy data. A procedure dispPolyLine for displaying these figure data is described in a Methods portion. On the other hand, in a Definitions portion of the object PHT, coordinates of a reference point of the text portion shown in FIG. 2B are filled in textX and textY, and text code data is filled in * moji. In a Methods portion, a procedure dispText for displaying these text data is described. Accordingly, by giving only a message disp for requesting a display to each of the entity objects, the procedure dispPolyLine and dispText exclusive for the figure and the text inside each entity object are initiated, so that map data is displayed in the display unit 110. Entity objects corresponding to three dimensions for carrying out the three-dimensional bird's-eye display also exist in the objects PHL and PHT. The structures of class objects PH3L and PH3T are almost the same as those of the two-dimensional objects PHLO and PHT, except that in the object PH3L, a Z coordinate value is added to the point data of the world coordinate system, that the display procedure is dispPolyLine 3 corresponding to three dimensions, that in the object PH3T, a Z coordinate value is added to the reference coordinates of a letter display, and that the display procedure is dispText3 corresponding to three dimensions.

According to the above-described method of three-dimensional display of a map, an approximate three-dimensional bird's-eye display can be made on a desired projection surface from a desired viewpoint vector direction, by using existing data of a two-dimensional housing map and basic attribute data of the map, without giving complete three-dimensional data like a CAD drawing. Therefore, there is an effect of expanding a range of application of digitalized two-dimensional map to the fields of three-dimensional simulation for architectural and civil engineering industries.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A method of displaying map information, said method comprising the steps of:

retrieving a relational object indicating relationships of map information from an object base in response to a display command;

retrieving entity objects from said object base in response to said retrieval of said relational object, wherein said entity object includes defined data and a procedure for processing said defined data;

processing said retrieved entity objects, wherein, a map data entity object of said entity objects retrieves two-dimensional map data from a map data base and an attribute data entity object of said entity objects retrieves attribute data from an attribute data base; and displaying on a display unit said two-dimensional map data, and said attribute data in accordance with a display format of said two-dimensional map data, wherein said displaying step comprises the steps of:

converting a displaying format of said retrieved attribute data into that of said retrieved two-dimensional map data, and displaying said two-dimensional map data and said attribute data on said display unit, wherein said converting step comprises the steps of:

storing in advance in a table format, height data that has been determined in advance for each of the elements of said two-dimensional map data, referring to said table in accordance with said attribute data to obtain height data of each element, and converting said two-dimensional map data into three-dimensional map data in accordance with said obtained height data.

2. A system for displaying figure information, comprising:

display means for displaying input data;

figure data base storage means for storing a figure data base which stores two-dimensional figure data;

associated data storage means for storing an associated data base which stores two-dimensional associated data related to said two-dimensional figure data;

executing means for tracing entity objects from an associated object in response to an input command, to initiate each of said entity objects;

figure data retrieving means for retrieving particular two-dimensional figure data from said figure data base in accordance with a figure data entity object of the traced entity objects;

associative retrieving means for retrieving particular two-dimensional associated data from said associated data base in accordance with the associated data entity object of said traced entity objects; and converting means for converting the particular two-dimensional figure data and associated data into three-dimensional display data and outputting the converted result to said display means.

3. A system according to claim 2, wherein said executing means includes:

object base storage means for storing an object base for storing hierarchical relational objects;

means for retrieving a first relational object from said object base in response to said input command and for initiating said first relational object; and repetitive retrieving means for sequentially retrieving next relational objects from said first relational object until all entity objects relevant to said input command and for initiating each retrieved relational object.

4. A system according to claim 2, wherein said converting means includes:

associative data converting means for converting the retrieved associated data into associated display data so as to relate a display format of said retrieved associated data to that of the retrieved figure data; and display data generating means for converting figure data and associated display data into three-dimensional display data and for outputting said three-dimensional display data to said display means.

5. A system according to claim 4, wherein said display data generating means includes generating means for converting a coordinate system for the figure data and the associated display data into a viewpoint coordinate system and for generating the three-dimensional display data for making an overhead view display from said converted figure data and the converted associated display data.

6. A system for displaying map information, comprising:

display means for displaying input display data;

object base storage means for storing an object base related to relational objects;

map data base storage means for storing a map data base related to figure elements of map data;

attribute data base storage means for storing an attribute data base related to attribute data associated with the figure elements of the map data;

retrieval executing means for retrieving a head one of relational objects from said object base in response to an input command, deriving entity objects from said head one relational object by referring to said object base, and for processing each of said derived entity objects;

map data retrieving means for retrieving map data from said map data base in response to the execution of a map data entity object of said derived entity objects;

attribute data retrieving means for retrieving attribute data from said attribute data base in response to the execution of an attribute data entity object of said derived entity objects; and converting means for converting said retrieved map data and the retrieved attribute data into the display data and for outputting said converted display data to said display means, wherein said converting means comprises:

means for converting the retrieved attribute data into display attribute data such that a display format of said retrieved attribute data matches that of said map data, and data converting means for converting said retrieved map data and said retrieved display attribute data into three-dimensional display data as the display data.

7. A system according to claim 6, wherein said data converting means comprises:

a table for storing in advance height data that has been determined in advance for an attribute of each figure element of said map data; and dimension converting means for referring to said table in accordance with said retrieved attribute data to obtain said height data and for converting said map data into three-dimensional map data in accordance with said obtained height data.

8. A system according to claim 7, wherein said data converting means further comprises:

means for converting a coordinate system of said three-dimensional display data into a viewpoint coordinate system and for converting said three-dimensional display data into an overhead view three-dimensional display data.

9. A method of displaying figure information, said method comprising the steps of:

tracing entity objects from a head one of relational objects in response to a display command, relational objects or entity object to be initiated being defined by definition in each relational object;

processing each of the traced entity objects;

retrieving two-dimensional figure data from a figure data base in accordance with the execution of each figure data entity object of said traced entity objects, said two-dimensional figure data being stored in said figure data base;

retrieving associative data from an associative data base in accordance with the execution of each associative data entity object of said traced entity objects, the associative data associated with each two-dimensional figure data being stored in said associative data base;

converting said retrieved two-dimensional figure data and said associative data into three-dimensional display data; and displaying said display data on a display unit.

10. A method according to claim 9, wherein said tracing step comprises the steps of:

retrieving the head relational object from an object base in response to said display command when said relational objects have a hierarchy structure, said hierarchical relational objects being stored in said object base; and sequentially tracing relevant objects from said head relational object until all of said entity objects related to the display command have been retrieved.

11. A method according to claim 9, wherein said converting step comprises the steps of:

converting said retrieved associative data into display associative data such that a display format of said retrieved associative data relates to that of said retrieved figure data; and generating the three-dimensional display data from said figure data and said display associative data.

12. A method according to claim 11, wherein said converting step further comprises the step of converting a coordinate system of said three-dimensional display data into a viewpoint coordinate system to generate the three-dimensional display data for an overhead view display.

13. A figure display system comprising:

storage means for storing a plurality of data bases of a hierarchical structure;

display means for displaying input display data; and retrieving means for retrieving data from a first layer data base of said hierarchical structure in response to an input instruction, sequentially retrieving next data in accordance with the retrieved data toward a last layer data base, and outputting desired data as the display data to said display means when said desired data has been retrieved, wherein said retrieving means further includes:

converting means for, when said desired data is two-dimensional data, converting said two-dimensional desired data into desired three-dimensional data in accordance with height data predetermined for an attribute of each element of data and attributes of elements of the desired data.

14. A figure displaying system according to claim 13, wherein said converting means further includes means for converting a coordinate system of said desired three-dimensional data into a viewpoint coordinate system such that the desired three-dimensional data can be displayed in an overhead view display manner.

15. A three-dimensional display system, comprising:

map data base means for storing map data of a two-dimensional coordinate system, the map data including data indicative of a building;

means for storing attribute data indicative of a number of floors of said building;

means for retrieving the map data from said map data base means and said attribute data related to said map data from said attribute data storing means;

means for estimating data indicative of a height of said building from the data indicative of the number of floors of said building;

converting means for perspectively converting the two-dimensional data indicative of said building into three-dimensional data from a desired viewpoint in accordance with said height data; and display means for displaying the three-dimensional data of said building.

16. A three-dimensional display system according to claim 15, wherein said estimating means includes:

table means for storing data indicative of an estimated height per floor of said building, said estimated height data being predetermined;

means for obtaining said estimated height data for said building from said table means; and means for estimating said height data of said building from said estimated height data and the data indicative of the number of floors of said building.

17. A three-dimensional display system according to claim 15, wherein said converting means further includes means for perspectively converting said map data, and said display means further includes means for displaying the converted map data and for displaying the three-dimensional data of said building in superposition on the displayed two-dimensional map data.

18. A three-dimensional display system according to claim 15, wherein said display means further includes means for displaying the map data of the two-dimensional coordinate system in a first window, said building being located within a designated area of a first window, and for the three-dimensional data of said displayed building in a second window.

19. A three-dimensional display system according to claim 18, wherein said display means further includes means for displaying a first marker indicative of said designated area and a second marker indicative of a direction from the desired viewpoint and a surface for the perspectively converted data to be projected, and for synchronously displaying said first and second markers and said building in accordance with a designated perspective conversion parameter.

20. A method of displaying a map in three-dimensional manner, said method comprising the steps of:

supplying map data of a two-dimensional coordinate system to a map data base;

storing attribute data indicating number of floors of each of a plurality of buildings indicated as elements of the map data;

estimating data indicating a height of each building in accordance with the attribute data indicating the number of floors of each building;

perspectively converting data representing the buildings expressed in the height data; and three-dimensionally displaying the converted building data on a display unit.

21. A method according to claim 20, wherein said estimating step includes:

storing data indicating a predetermined height of each building per floor; and estimating said height data of each building in accordance with the predetermined height data and the data indicating the number of floors of each building.

22. A method according to claim 20, wherein said conversion step further includes perspectively converting the map data, and said displaying step further includes displaying the converted map data and three-dimensionally displaying the building data in superposition on said displayed map data.

23. A method according to claim 20, wherein said display step further includes:

displaying the map data of a two-dimensional coordinate system within a first window; and three-dimensionally displaying the building data within a second window, the buildings being located within a designated range within said first window.

24. A method according to claim 23, wherein said displaying step further includes:

displaying within said first window a first marker indicating the designated range, and a second marker indicating a line-of-sight direction for the three-dimensional display and a projection surface of the perspective conversion; and synchronously displaying said first marker, said second marker and the building data in accordance with data of designated parameters for the perspective conversion.

25. A three-dimensional display system, comprising:

map data base means for storing map data of a two-dimensional coordinate system;

means for storing attribute data indicating a number of floors of each of a plurality of buildings as elements within said map data;

means for retrieving the map data from said map data base means and said attribute data related to said map data from said attribute data storing means;

means for estimating data indicating a height of each building in accordance with the data indicating said number of floors;

conversion means for perspectively converting data representing each building expressed by use of the height data; and display means for three-dimensionally displaying building data that is a result of said conversion.

26. A three-dimensional display system according to claim 25, wherein said estimating means includes:

means for storing data indicating a predetermined height per one floor; and means for estimating the height data of each building in accordance with the predetermined height data and the data of the number of floors.

27. A three-dimensional display system according to claim 25, wherein said conversion means further includes means for perspectively converting the map data, and said display means further includes means for displaying the converted map data and for three-dimensionally displaying the building data in superposition on the displayed map data.

28. A three-dimensional display system according to claim 23, wherein said display means further includes means for displaying the map data of a two-dimensional coordinate system within a first window and for three-dimensionally displaying the building data within a second window, said buildings being located within a designated range within said first window.

29. A three-dimensional display system according to claim 25, wherein said display means further includes means for displaying, within said first window, a first marker indicating the designated range and a second marker indicating a line-of-sight direction for the three-dimensional display and a projection surface of the perspective conversion, and for synchronously displaying said first marker, said second marker and the building data in accordance with the data of designated parameters for the perspective conversion.

30. A three-dimensional display system, comprising:

map data base means for storing map data of a two-dimensional coordinate system, said map data including data indicative of a building;

means for storing attribute data indicative of a number of floors of said building;

object base storage means for storing first entity objects concerning said map data, second entity objects concerning said attribute data and relational objects having pointers for relating said first entity objects and said second entity objects, wherein an object includes a capsuled unit of defined data and a procedure for directly processing said defined data;

means for retrieving a relational object from said object base storage means in response to an input command, deriving said first entity objects and said second entity objects from said retrieved relational object by referring to said object base storage means, and for processing each of said derived entity objects;

means for retrieving said map data from said map data base means in response to execution of said derived first entity objects;

means for retrieving said attribute data from said attribute data storage means in response to execution of said derived second entity objects;

means for estimating data indicative of a height of said building from said attribute data indicative of the number of floors of said building;

converting means for prospectively converting said two-dimensional data indicative of said building into three-dimensional data from a desired perspective in accordance with said data indicative of a height of said building; and display means for displaying said three-dimensional data of said building.

* * * * *